United States Patent
Saleh et al.

(10) Patent No.: US 11,748,935 B2
(45) Date of Patent: Sep. 5, 2023

(54) BOUNDING VOLUME HIERARCHY TRAVERSAL

(71) Applicant: Advanced Micro Devices, Inc., Santa Clara, CA (US)

(72) Inventors: Skyler Jonathon Saleh, San Diego, CA (US); Ruijin Wu, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/126,499

(22) Filed: Dec. 18, 2020

(65) Prior Publication Data

US 2021/0209832 A1    Jul. 8, 2021

Related U.S. Application Data

(60) Provisional application No. 62/956,933, filed on Jan. 3, 2020.

(51) Int. Cl.
| | |
|---|---|
| *G06T 15/06* | (2011.01) |
| *G06T 17/00* | (2006.01) |
| *G06T 15/00* | (2011.01) |
| *G06T 15/08* | (2011.01) |

(52) U.S. Cl.
CPC ............ *G06T 15/06* (2013.01); *G06T 15/005* (2013.01); *G06T 15/08* (2013.01); *G06T 17/005* (2013.01)

(58) Field of Classification Search
CPC ....... G06T 15/06; G06T 15/005; G06T 15/08; G06T 17/005
See application file for complete search history.

(56) References Cited

U.S. PATENT DOCUMENTS

| | | | | |
|---|---|---|---|---|
| 2008/0074417 A1* | 3/2008 | Mejdrich | ............. | G06T 17/005 345/420 |
| 2008/0259075 A1* | 10/2008 | Fowler | ................... | G06T 15/06 345/421 |
| 2009/0289939 A1* | 11/2009 | Peterson | ............... | G06T 15/005 345/421 |
| 2015/0379756 A1* | 12/2015 | Shin | ....................... | G06T 15/06 345/426 |
| 2016/0071313 A1* | 3/2016 | Laine | ..................... | G06T 15/08 345/419 |
| 2018/0182158 A1* | 6/2018 | Karras | .................... | G06T 15/06 |
| 2019/0019326 A1* | 1/2019 | Clark | ...................... | G06T 15/06 |
| 2020/0051315 A1* | 2/2020 | Laine | .................... | G06T 17/005 |
| 2020/0211147 A1* | 7/2020 | Doyle | .................. | G06F 9/5077 |

OTHER PUBLICATIONS

Gasparian, T., "Fast Divergent Ray Traversal by Batching Rays in a BVH", Master's Thesis, Game & Media Technology, Utrecht University Department of Information and Computing Sciences, 17 pgs., Dec. 5, 2016, downloaded from: https://dspace.library.uu.nl/bitstream/handle/1874/343844/Master_s_thesis_Tigran_Gasparian.pdf?sequence=2&isAllowed=y#:~:text=The%20traversal%20algorithm%20starts%20by,of%20the%20ray%20is%20suspended on Dec. 14, 2020.

* cited by examiner

*Primary Examiner* — Michael Le
(74) *Attorney, Agent, or Firm* — Volpe Koenig

(57) ABSTRACT

A technique for performing ray tracing operations is provided. The technique includes initiating bounding volume hierarchy traversal for a ray against geometry represented by a bounding volume hierarchy; identifying multiple nodes of the bonding volume hierarchy for concurrent intersection tests; and performing operations for the concurrent intersection tests concurrently.

20 Claims, 7 Drawing Sheets

US 11,748,935 B2

BOUNDING VOLUME HIERARCHY TRAVERSAL

CROSS-REFERENCE TO RELATED APPLICATIONS

This application claims the benefit of U.S. Provisional Patent Application No. 62/956,933 filed Jan. 3, 2020 and is incorporated by reference as if fully set forth herein.

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes initiating bounding volume hierarchy traversal for a ray against geometry represented by a bounding volume hierarchy; identifying multiple nodes of the bonding volume hierarchy for concurrent intersection tests; and performing operations for the concurrent intersection tests concurrently.

Figure 1:
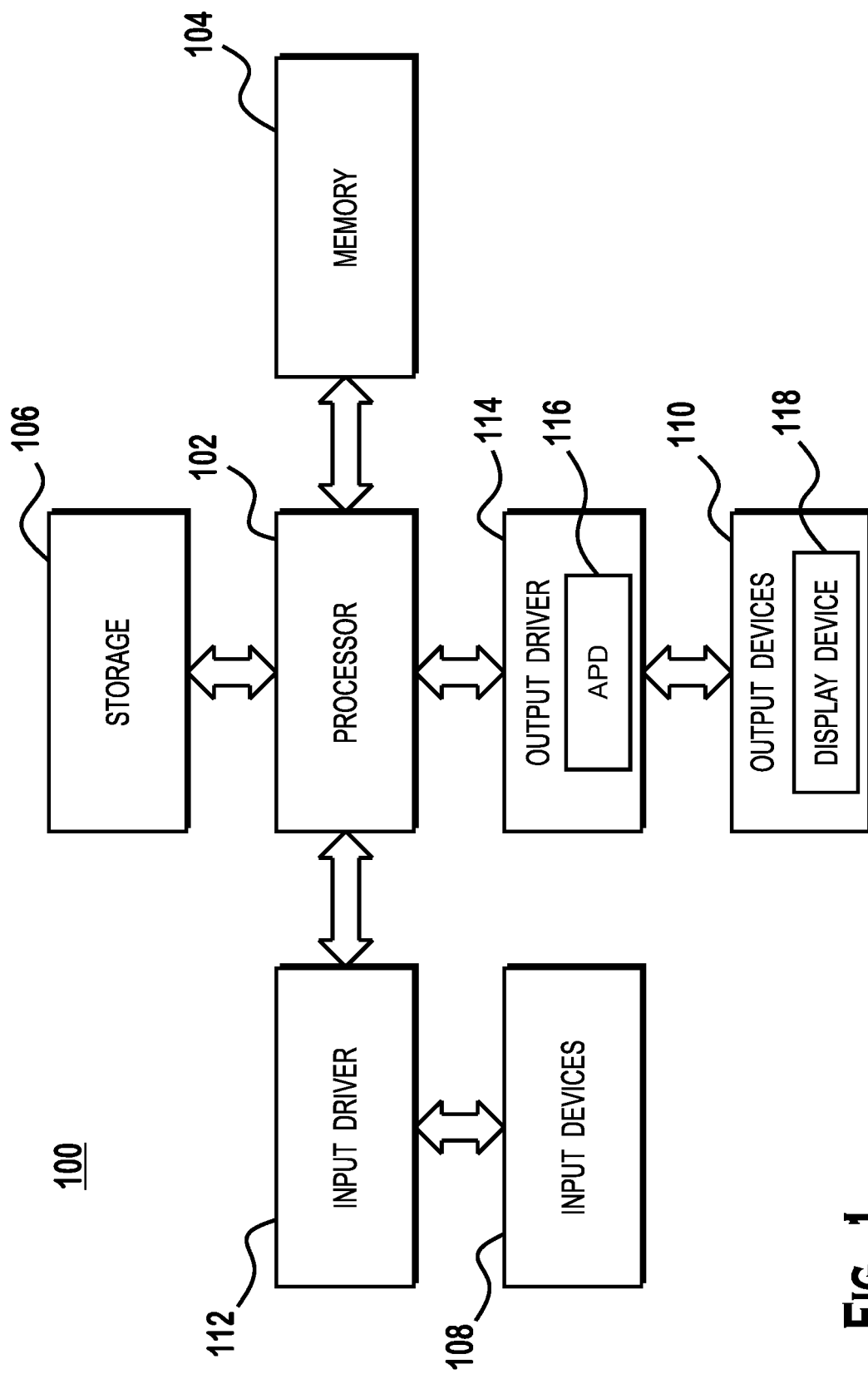
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
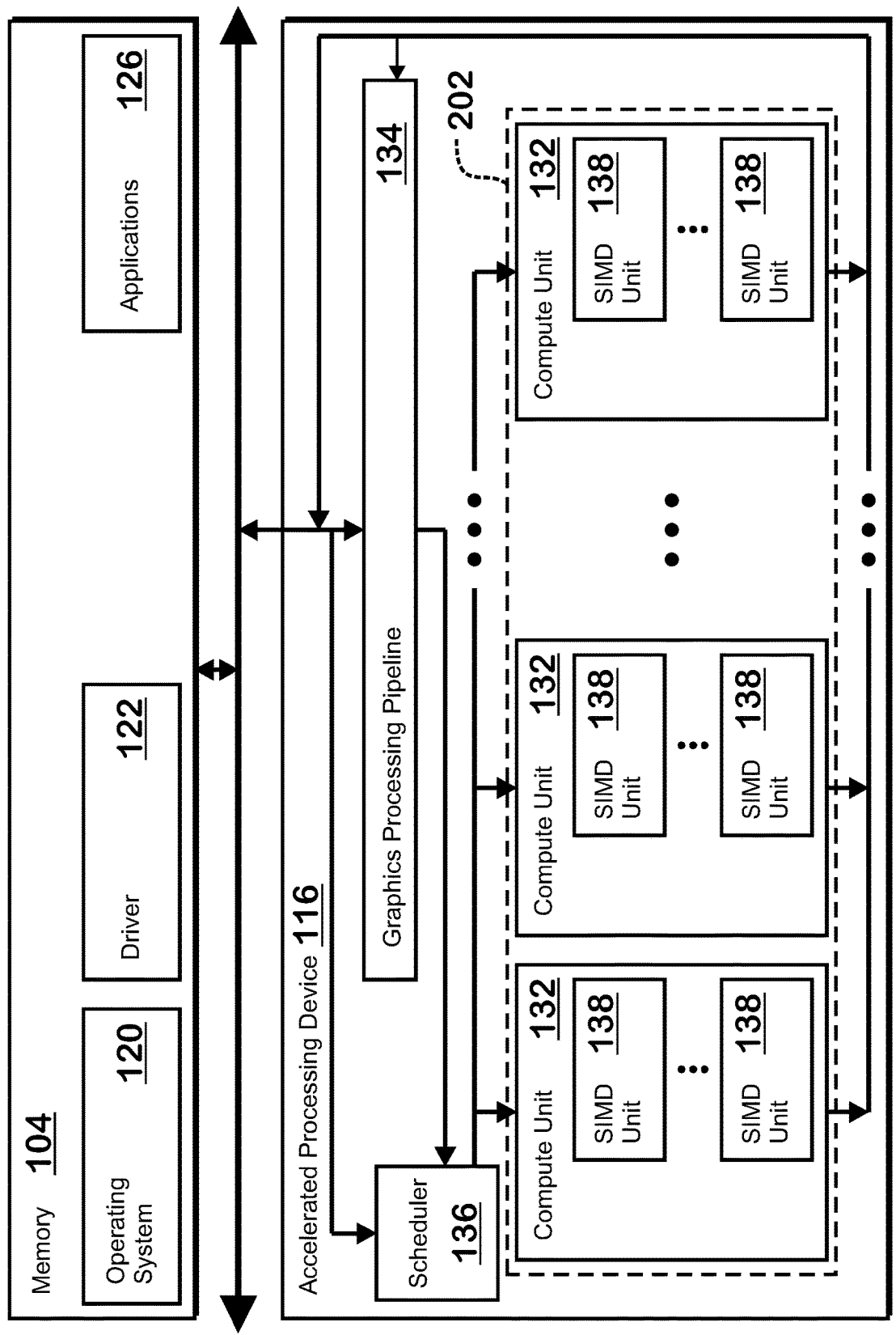
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (together, parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
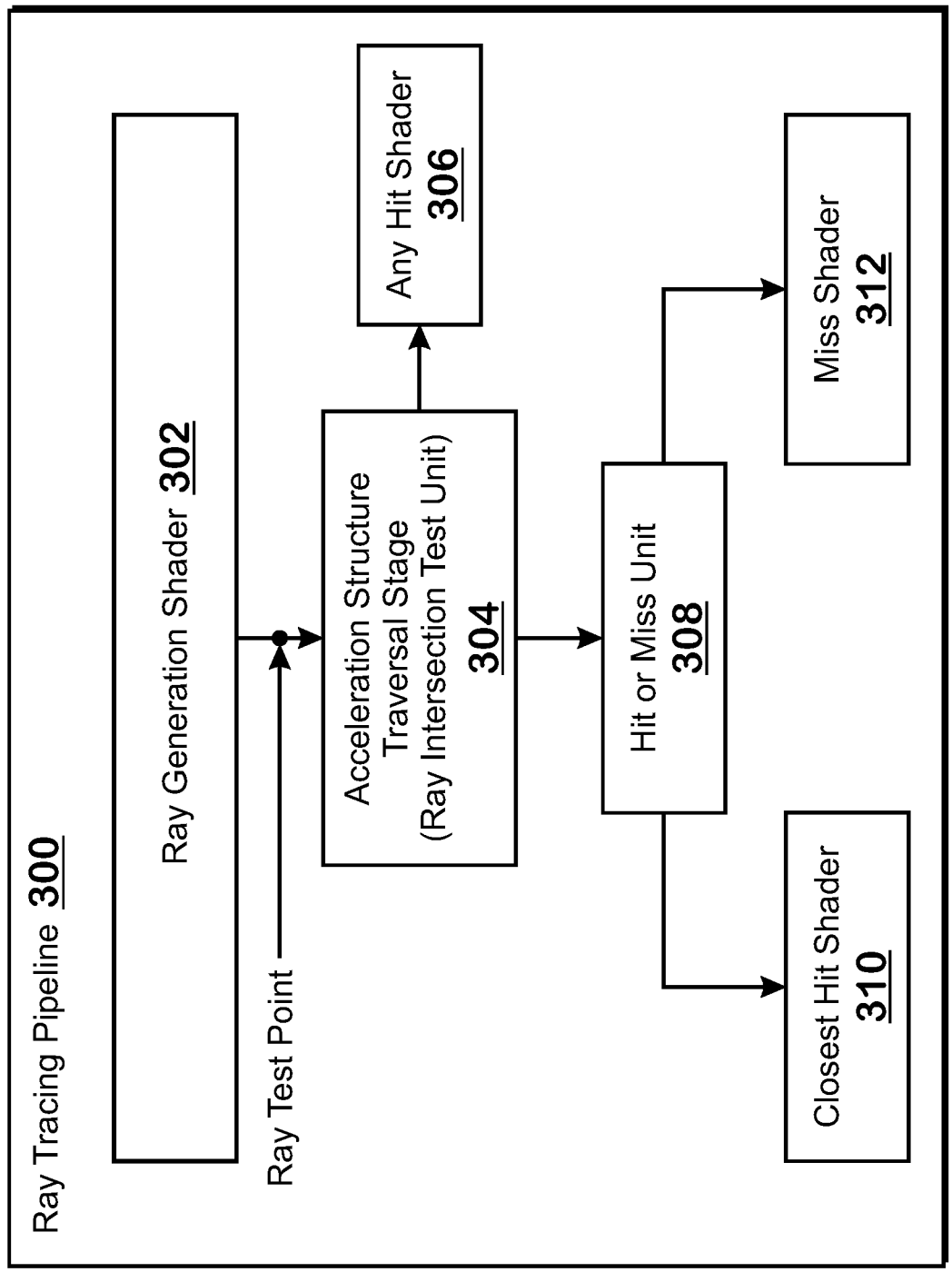
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used. It should be understood that, in various examples, to render a scene, the APD 116 accepts and executes commands and data from, for example, the processor 102, to perform a number of ray intersection tests and to execute appropriate shaders.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In an example bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent different axis aligned bounding boxes that cover different parts of the entire region. Each of those two children has two child nodes that represent axis aligned bounding boxes that subdivide the space of their parents, and so on. Leaf nodes represent a triangle or other primitive against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, and tests against leaf node primitives.

Figure 4:
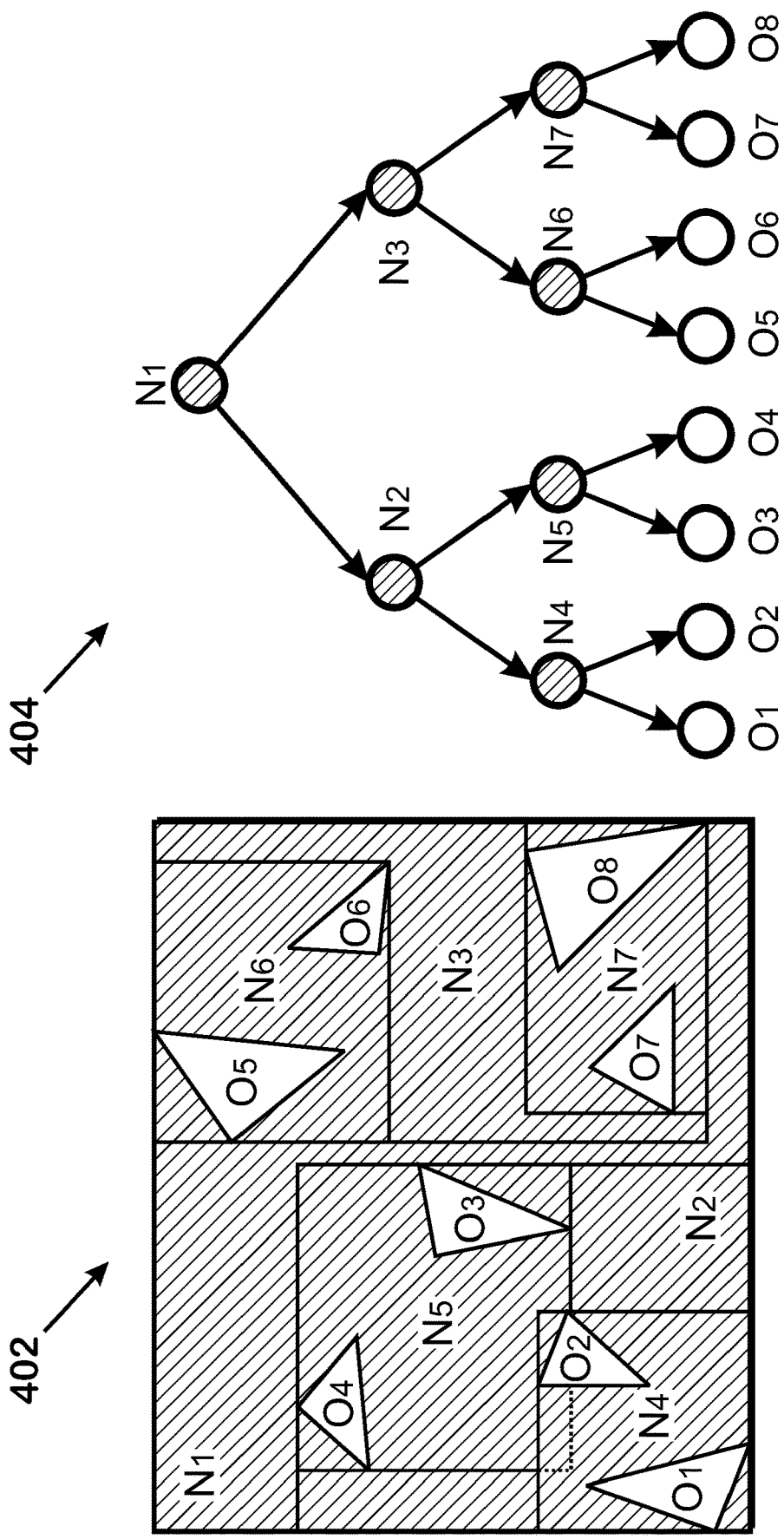
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

As just stated, performing an intersection test for a ray involves traversing a bounding volume hierarchy 404. In general, traversing the bounding volume hierarchy 404 involves the ray intersection test unit 304 fetching data for box nodes and performing an intersection test for the ray against those nodes. If the test succeeds, the ray intersection test unit 304 fetches data for children of that box node and performs intersection for those nodes.

In some situations, fetching data for a node requires a fetch to memory (e.g., memory local to the APD 116 or system memory 104). It is possible for such a fetch to incur a relatively large amount of latency, such as thousands of APD processor clock cycles. Further, the bounding volume hierarchy 404 includes data dependencies, since the determination of whether to fetch data for a particular node is based on the results of an intersection test for a parent of that node. A strict depth-first traversal of the bounding volume hierarchy 404, which would have the benefit of requiring relatively lower number of intersection tests, has the drawback that such traversal is unable to hide memory latency by pipelining memory fetches for multiple nodes, due to the data dependencies. For this reason, the present disclosure presents a technique for parallelizing intersection tests by performing tests against multiple nodes of the same BVH for the same ray, concurrently.

Figure 5:
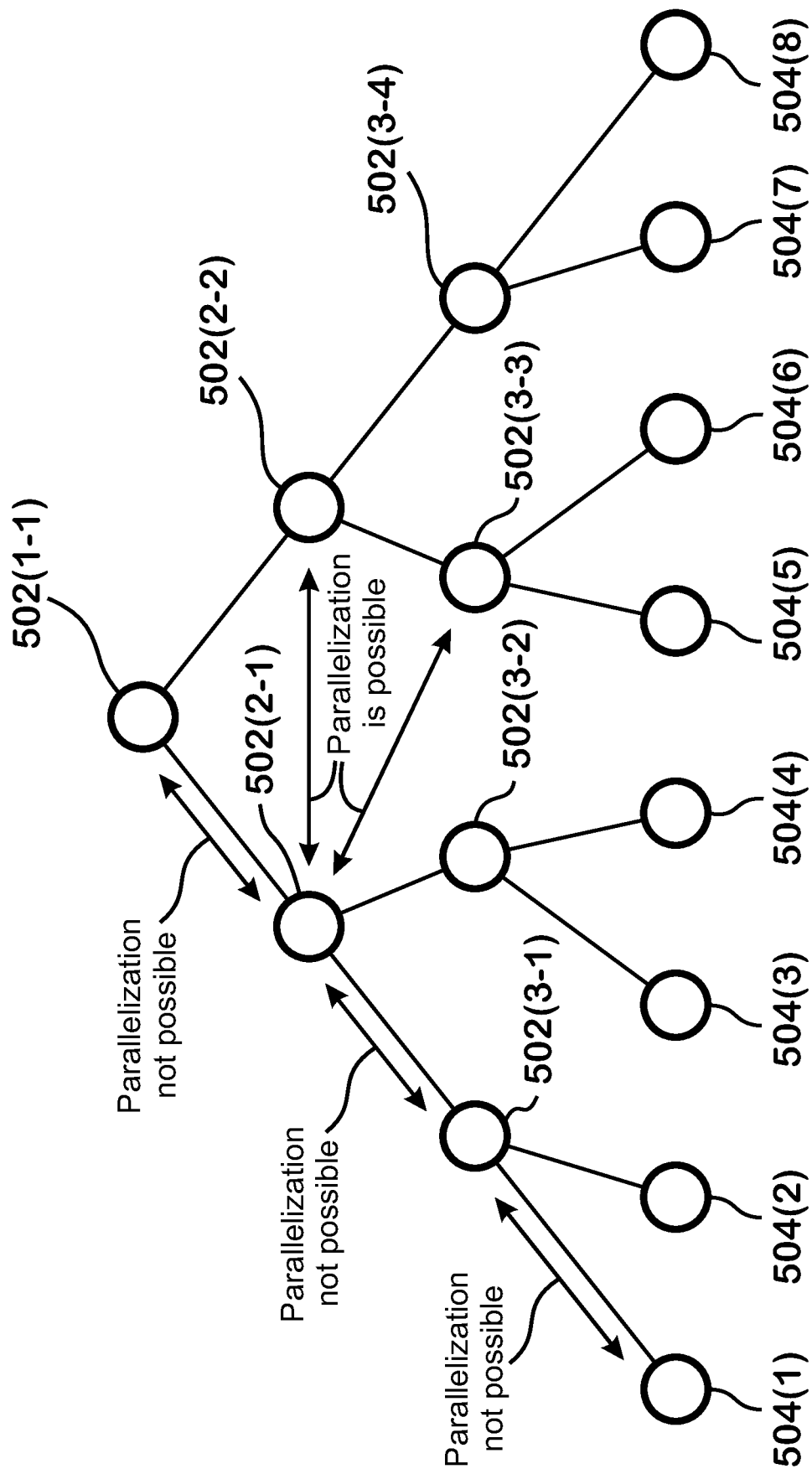
FIG. 5 illustrates aspects of a bounding volume hierarchy, according to an example.

FIG. 5 illustrates aspects of a bounding volume hierarchy 500, according to an example. The BVH 500 includes box nodes 502 and leaf nodes 504. The box nodes 502 are similar to the box nodes (labeled with "N") of FIG. 4 and the leaf nodes 504 are similar to the leaf nodes (labeled with "O") of FIG. 4.

In the BVH, nodes that are not part of the same ancestor chain are parallelizable. An ancestor chain is a node, the parent of the node, the parent of the parent of the node, and so on. In other words, an ancestor chain of a node includes all direct ancestors of the node. In the situation that two nodes are part of the same ancestor chain, those nodes cannot be parallelized because the result of the node higher up in the BVH 500 is required before work for the node lower in the BVH 500 can be performed.

In FIG. 5, several example pairs of nodes that are parallelizable are illustrated. For example, node 502(2-1) and node 502(2-2) are parallelizable as these nodes 502 are not in the same ancestor chain. Nodes 502(2-1) and 502(3-3) are also parallelizable. On the other hand, parallelization is not possible between any of node 502(1-1), node 502(2-1), 502(3-1), or 504(1).

The ray intersection test unit 304 therefore parallelizes ray intersection tests for noes that are parallelizable in at least some situations. This parallelization allows for memory latency hiding because multiple operations that fetch data from memory can be performed concurrently.

To parallelize ray intersection tests, the ray intersection test unit 304 performs intersection tests for two different nodes 502 for the same ray in parallel. Performing intersection tests for two different nodes 502 for the same ray in parallel includes fetching the data for those nodes concurrently, so that memory latency is hidden. In an example, the ray intersection test unit 304 determines that an intersection test is to be performed for a first node 502 and that an intersection test is to be performed for a second node 502. The ray intersection test unit 304 causes data for the first node 502 and data for the second node 502 to be fetched concurrently. This data describes at least the geometry corresponding to the node 502 (e.g., the information that describes the shape of a bounding box), and, in some instances, also includes pointers to other nodes (for example, a box node includes pointers to child box nodes). Fetching the data concurrently means that memory transactions to fetch the data for the first node 502 and the data for the second node 502 are outstanding at the same time. In other words, the ray intersection test unit 304 requests data for one node 502 to be fetched and requests data for the other node 502 to be fetched without waiting for the data to be returned for the first node or without waiting for the intersection test for the fetched first node to be performed. The ray intersection test unit 304 causes a ray intersection test to be performed for the first node 502 and causes a ray intersection test to be performed for the second node 502.

The ray intersection test unit 304 traverses the nodes 502 of the BVH 500 in any technically feasible order. In an example, the ray intersection test unit 304 stores a collection of nodes for which the ray intersection test unit 304 has already determined that an intersection test should be performed. The ray intersection test unit 304 selects two or more such nodes to perform ray intersection tests for concurrently, as described elsewhere herein. As described, the ray intersection test unit 304 fetches data for those nodes concurrently. The ray intersection test unit 304 performs ray intersection tests for these nodes to determine additional nodes to place into the collection. For example, if the ray intersection test unit 304 determines that the ray intersects the bounding box associated with one of these nodes, then the ray intersection test unit 304 stores the children of that node into the collection of nodes. After this, the above operations repeat as long as there are nodes in the stored collection of nodes. It should be noted that the stored collection of nodes is a collection of pointers to nodes, as the data for those nodes has not yet been fetched. The ray intersection test unit 304 uses these pointers to fetch data for the nodes.

Figures 6, 7:
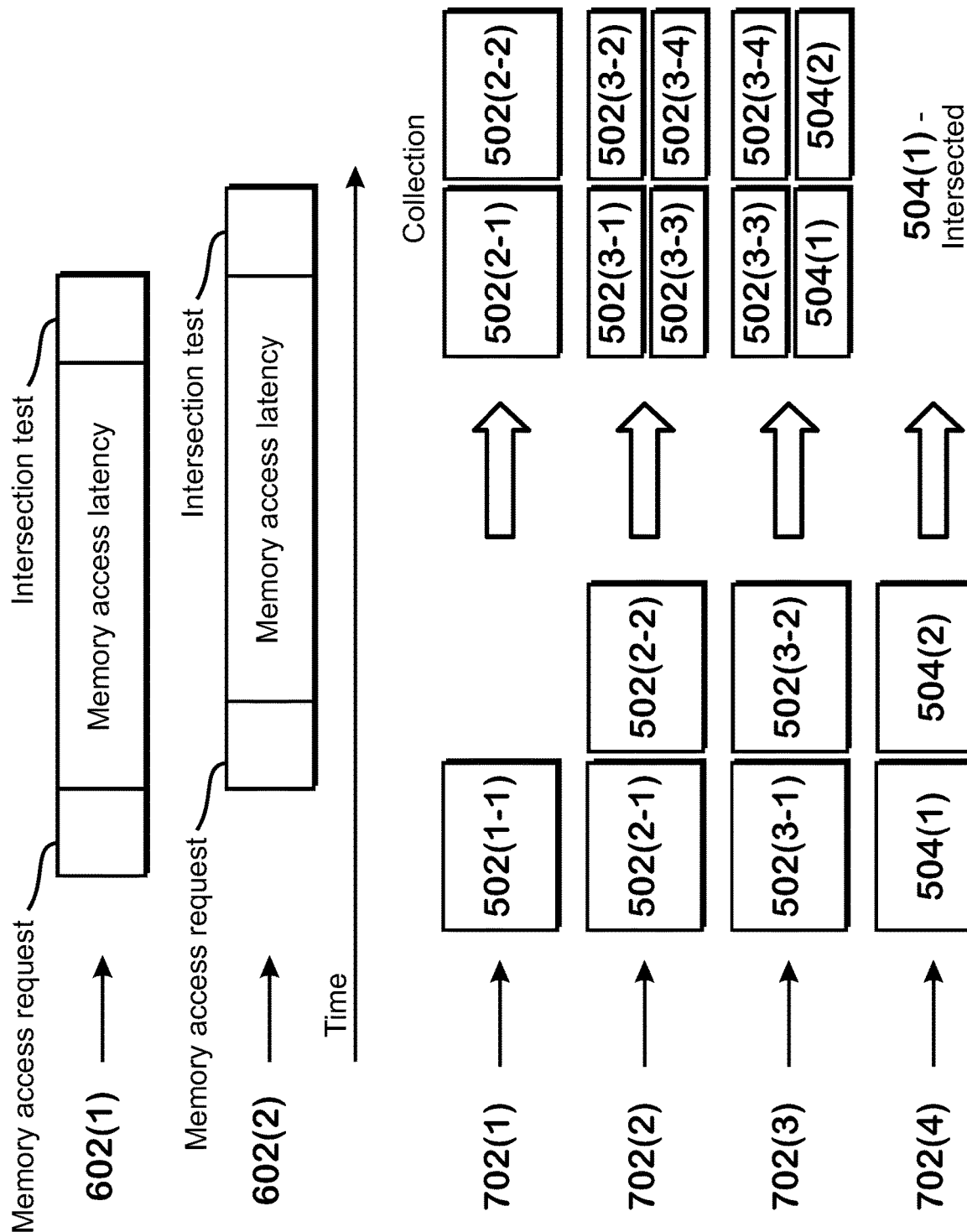
FIG. 6 illustrates an example of concurrently performing ray intersection tests for two nodes of a bounding volume hierarchy.
FIG. 7 illustrates an example traversal through a bounding volume hierarchy, according to an example.

FIG. 6 illustrates an example of concurrently performing ray intersection tests for two nodes of a BVH 500 for a BVH traversal for a single (the same) ray. It should be emphasized that these ray intersection tests are for a BVH traversal for a single ray. That is, these ray intersection tests are the result of a request to test one single ray for intersection with primitives of a scene. This request generates multiple ray intersection tests as the ray tracing pipeline 300 traverses the BVH 500.

The illustrated intersection tests 602 include a portion in which requests to fetch the data for the node are made (memory access requests), a latency for the memory access request, which represents the time taken to actually fetch the requested data from memory and return that data to the ray intersection test unit 304, and an intersection test, which represents the ray intersection test unit 304 performing the test for intersection of the ray against the geometry associated with the node (e.g., a bounding box). As can be seen, the memory access latency for both intersection tests 602 overlap in time.

FIG. 7 illustrates an example traversal through the BVH 500 of FIG. 5, with parallelization of ray intersection tests, according to an example. FIG. 7 shows several execution time periods 702. An execution time period 702 represents a period in which ray execution tests are performed, and include the various operations illustrated in FIG. 6, such as the memory access request, latency, and the intersection test. In an example, the time periods 702 start from the earliest memory access request for a node and end with the latest intersection test for a node.

In FIG. 7, the BVH 500 is being traversed to determine the intersection of a ray with one or more primitives of the BVH 500. The traversal is performed in an "any hit" mode, in which the traversal is terminated in response to any hit against a primitive being detected. Thus, as described below, the traversal terminates in response to detection that the primitive of node 504(1) is intersected by the ray.

In the first time period 702(1), operations for a ray intersection test for node 502(1-1) are performed by the ray intersection test unit 304. The ray intersection test results in a determination that the ray intersects the geometry for node 502(1-1) and therefore the ray intersection test unit 304 places the children of node 502(1-1), which are 502(2-1) and 502(2-2), into the stored collection of nodes to test.

In time period 702(2), the ray intersection test unit 304 performs tests for node 502(2-1) and node 502(2-2). The ray intersection test unit 304 determines that the ray intersects the bounding box for both of these nodes and therefore places the children of these nodes 502 into the collection. These children include node 502(3-1), node 502(3-2), node 502(3-3), and node 502(3-4), which the collection thus includes.

In time period 702(3), the ray intersection test unit 304 performs tests for node 502(3-1), and node 502(3-2). The ray intersection test unit 304 determines that the ray intersects the bounding box for node 502(3-1), but does not intersect the bounding box for node 502(3-2). Thus, the ray intersection test unit 304 places the children of node 502(3-1) into the collection but does not place the children of node 502(3-2) into the collection. The collection thus includes node 502(3-3), node 502(3-4), node 504(1), and node 504(2), but not node 504(3) or node 504(4).

In time period 702(4), the ray intersection test unit 304 performs tests for node 504(1) and node 504(2). The ray intersection test unit 304 determines that the ray intersects node 504(1) and thus terminates BVH traversal. In various examples, this intersection triggers execution of a shader program, such as an any hit shader program to perform operations for the intersected primitive.

Although a particular order of traversal through the BVH 500 has been shown, it should be understood that any order of traversal falls within the scope of the present disclosure. In one example, the ray intersection test unit 304 prioritizes selection of nodes from the collection that are lower (e.g., towards the bottom of the tree structure) in the BVH 500 ahead of nodes that are higher in the BVH 500. In one example, the collection is a stack, in which the most recent item placed into the collection is also the item that is next to be retrieved from the collection. Using a stack as a collection generally means that traversing the BVH 500 tends towards a depth-first order. However, the order is not exactly depth first, since nodes are selected for concurrent intersection tests. For example, in many situations, nodes from the same level of the BVH 500 are selected to perform intersection tests concurrently, meaning that there is traversal through sister branches, which results in deviation from a depth-first search.

In an example, the ray intersection test unit 304 traverses the BVH 500 in a loop. Within the loop, the ray intersection test unit 304 performs the following steps. The ray intersection test unit 304 fetches one or more nodes from the collection. The ray intersection test unit 304 begins ray intersection tests for each such node. Upon each such test ending, the ray intersection test unit 304 places the results of such tests—including pointers to children for which intersection occurs—into the collection. In response to all such tests being complete, the ray intersection test unit 304 determines whether there are any items in the collection. If there are more items, the ray intersection test unit 304 returns to the beginning of the loop and if there are no more such items, then the traversal of the BVH 500 is complete. In some examples, the ray intersection test unit 304 ends traversal of the BVH 500 early. For example, for an any hit intersection mode test, the ray intersection test unit 304 ends traversal of the BVH 500 in response to detecting that the ray intersects with any primitive. For a closest hit intersection mode test, the ray intersection test unit 304 ends traversal early upon determining a closest hit with a primitive.

It should be understood that the collection is a data structure stored in a memory, where the memory can be in any technically feasible location, such as within the APD 116.

It is possible for the ray intersection test unit 304 to parallelize intersection tests for the same ray as well as different rays. More specifically, it is possible for the ray intersection test unit 304 to perform BVH traversals for different rays concurrently, as well as performing tests for multiple nodes within one or more such BVHs concurrently. As described elsewhere, a benefit of such parallelization is to hide the latency of memory accesses for fetching node data (see, e.g., FIG. 6). Thus, for example, it would be beneficial to have many such memory accesses outstanding for multiple rays and for multiple nodes of different such rays. It should be understood that the ray tracing pipeline 300 is capable of performing operations for multiple rays concurrently. In an example, rendering a scene includes generating and processing a very large number of rays, so APD 116 requests the ray tracing pipeline 300 to perform operations for multiple such rays in parallel.

In an example, a memory access request takes one thousand clock cycles, and the ray intersection test unit 304 performs a box node test in one cycle. In this situation, a combination of concurrent rays and concurrent in-ray nodes that results in a total of 1,000 outstanding memory access requests hides the latency of these operations. For example, if the ray intersection test unit 304 is configured to perform node intersection tests for two in-ray nodes and for five hundred different rays, then the result is 1,000 outstanding memory access requests. In this situation, the ray intersection test unit 304 would be capable of performing a box intersection test each cycle.

Figure 8:
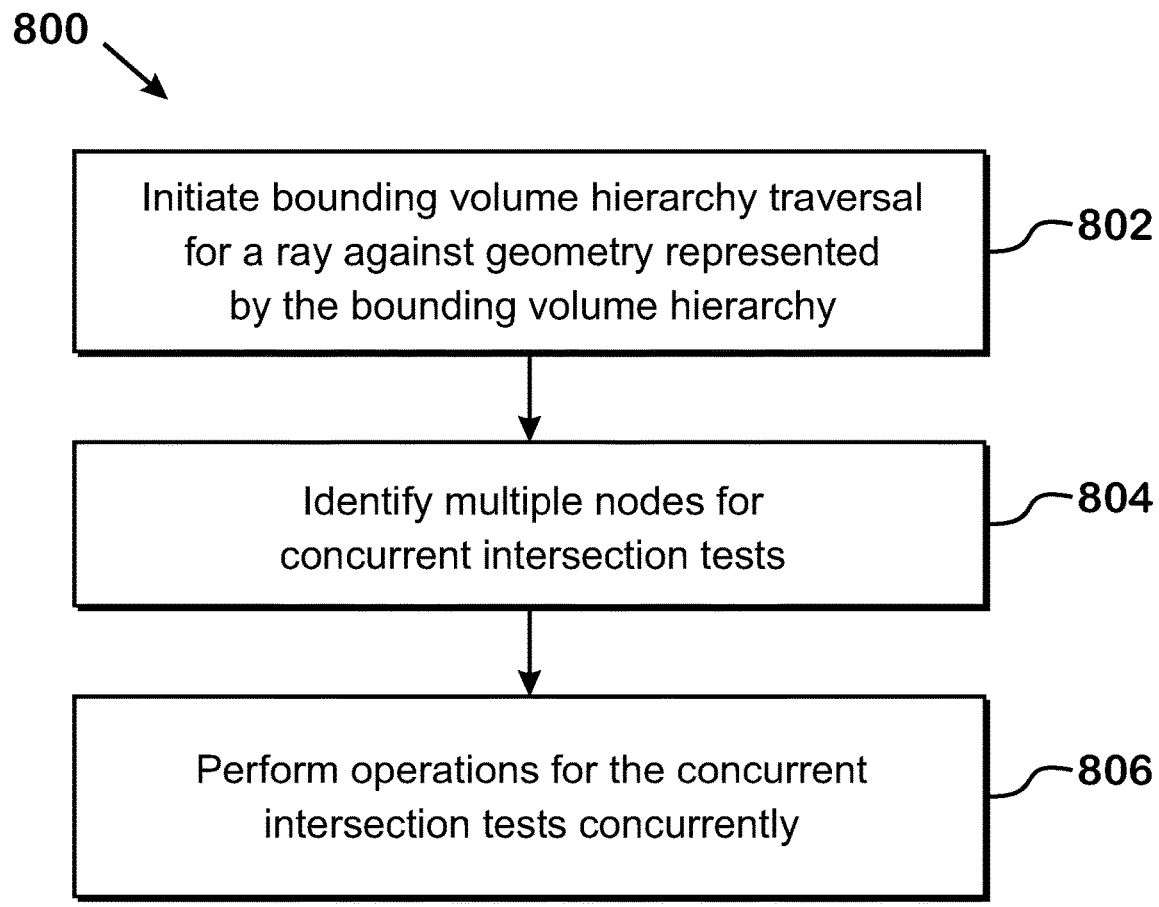
FIG. 8 is a flow diagram of a method for performing intersection tests for ray tracing, according to an example.

FIG. 8 is a flow diagram of a method 800 for performing intersection tests for ray tracing, according to an example. Although described with respect to the system of FIGS. 1-7, those of skill in the art will recognize that any system, configured to perform the steps of the method 800 in any technically feasible order, falls within the scope of the present disclosure.

At step 802, the ray intersection test unit 304 initiates a bounding volume hierarchy traversal for ray against geometry represented by the bounding volume hierarchy. This bounding volume hierarchy traversal is performed to test for intersection of a ray against scene geometry represented by the bounding volume hierarchy. This traversal is initiated as described elsewhere herein, such as in response to an entity such as a shader (such as the ray generation shader 302) spawning a ray for intersection testing.

At step 804, the ray intersection test unit 304 identifies multiple nodes of the bounding volume hierarchy to perform intersection tests for concurrently. Note, step 804 does not necessarily represent the first nodes for which intersection tests are performed for the bounding volume hierarchy. In an example, an intersection test is performed for a root node between steps 802 and 804. In some examples, identifying the multiple nodes for which to perform concurrent intersection tests includes examining a collection of nodes that the ray intersection test unit 304 builds while traversing the bounding volume hierarchy. In an example, upon detecting that the ray intersects a box node, the ray intersection test unit 304 places pointers to the children of that box node into the collection. In some examples, the ray intersection test unit 304 executes a loop as described elsewhere herein. In the body of the loop, the ray intersection test unit 304 selects multiple nodes from the collection if multiple nodes are present in the collection.

At step 806, the ray intersection test unit 304 performs operations for intersection tests for the identified nodes concurrently. In some examples, concurrent execution means that memory access requests to fetch the data of the node are outstanding at the same time, to hide memory access latency. In some examples, these memory access requests are also outstanding at the same time as memory access requests for rays other than the ray for which the operations for intersection tests are being performed at step 806. In other words, in some examples, memory access requests are outstanding for intersection tests for different rays as well as for different nodes for a single ray. In some examples, the operations for intersection tests include the operations illustrated with respect to FIG. 6, including initiating memory access requests to fetch the node data, latency for fetching that data, and the actual intersection tests.

In various examples, the ray intersection test unit 304 repeats steps 804 and 806 until the bounding volume hierarchy traversal is completed. In some examples, the bounding volume hierarchy traversal is completed when there are no nodes in the collection after all outstanding node intersection tests have been completed.

Note that although the present disclosure describes triangles as being in the leaf nodes of the bounding volume hierarchy, any other geometric shape could alternatively be used in the leaf nodes. In such instances, compressed triangle blocks include two or more such primitives that share at least one vertex.

Each of the units illustrated in the figures represent hardware circuitry configured to perform the operations described herein, software configured to perform the operations described herein, or a combination of software and hardware configured to perform the steps described herein. For example, the ray tracing pipeline 300, ray generation shader 302, any hit shader 306, hit or miss unit 308, miss shader 312, closest hit shader 310, and acceleration structure traversal stage 304 are implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   initiating a bounding volume hierarchy traversal for a ray against geometry represented by a bounding volume hierarchy;
   identifying multiple nodes of the bounding volume hierarchy for concurrent intersection tests, wherein the multiple nodes are not part of an ancestor chain of the bounding volume hierarchy, and wherein the multiple nodes are not part of the same level of the bounding volume hierarchy; and performing an intersection test for a first node of the multiple nodes at least partially concurrently with a second node of the multiple nodes.

2. The method of claim 1, wherein the bounding volume hierarchy traversal is initiated in response to spawning a ray for intersection testing against geometry of a scene represented by the bounding volume hierarchy.

3. The method of claim 1, further comprising placing node pointers into a collection in response to detecting that the ray intersects a box node, wherein the node pointers are pointers to child nodes of the box node.

4. The method of claim 3, wherein identifying the multiple nodes comprises selecting nodes from the collection.

5. The method of claim 1, wherein performing the intersection test includes performing memory access requests to fetch data for the multiple nodes in a manner that the memory access requests are outstanding at the same time.

6. The method of claim 5, wherein the memory access requests are outstanding at the same time as memory access requests to fetch node data for nodes for a different ray.

7. The method of claim 1, wherein the intersection test includes operations to fetch data for the multiple nodes and operations to perform an intersection test between geometry indicated by the fetched data and the ray.

8. The method of claim 1, further comprising repeating the identifying and intersection test until traversal of the bounding volume hierarchy is complete.

9. The method of claim 8, wherein the bounding volume hierarchy is complete in the situation that a collection storing nodes to perform intersection tests for is empty when no outstanding intersection tests exist.

10. A system for performing ray tracing operations, the system comprising:
a processor configured to execute a shader program to request a ray intersection test; and
a ray intersection test processor configured perform the ray intersection test by:
initiating a bounding volume hierarchy traversal for a ray against geometry represented by a bounding volume hierarchy;
identifying multiple nodes of the bounding volume hierarchy for concurrent intersection tests, wherein the multiple nodes are not part of an ancestor chain of the bounding volume hierarchy, and wherein the multiple nodes are not part of the same level of the bounding volume hierarchy; and
performing an intersection test for a first node of the multiple nodes at least partially concurrently with a second node of the multiple nodes.

11. The system of claim 10, wherein the bounding volume hierarchy traversal is initiated in response to spawning a ray for intersection testing against geometry of a scene represented by the bounding volume hierarchy.

12. The system of claim 10, wherein the ray intersection test processor is further configured to place node pointers into a collection in response to detecting that the ray intersects a box node, wherein the node pointers are pointers to child nodes of the box node.

13. The system of claim 12, wherein identifying the multiple nodes comprises selecting nodes from the collection.

14. The system of claim 10, wherein performing the intersection test includes performing memory access requests to fetch data for the multiple nodes in a manner that the memory access requests are outstanding at the same time.

15. The system of claim 14, wherein the memory access requests are outstanding at the same time as memory access requests to fetch node data for nodes for a different ray.

16. The system of claim 10, wherein the intersection test includes operations to fetch data for the multiple nodes and operations to perform an intersection test between geometry indicated by the fetched data and the ray.

17. The system of claim 10, wherein the ray intersection test processor is further configured to repeat the identifying and intersection test until traversal of the bounding volume hierarchy is complete.

18. The system of claim 17, wherein the bounding volume hierarchy is complete in the situation that a collection storing nodes to perform intersection tests for is empty when no outstanding intersection tests exist.

19. A non-transitory computer-readable medium storing instructions that, when executed by a processor, cause the processor to execute a method comprising:
initiating a bounding volume hierarchy traversal for a ray against geometry represented by a bounding volume hierarchy;
identifying multiple nodes of the bounding volume hierarchy for concurrent intersection tests, wherein the multiple nodes are not part of an ancestor chain of the bounding volume hierarchy, and wherein the multiple nodes are not part of the same level of the bounding volume hierarchy; and
performing an intersection test for a first node of the multiple nodes at least partially concurrently with a second node of the multiple nodes.

20. The non-transitory computer-readable medium of claim 19, wherein the bounding volume hierarchy traversal is initiated in response to spawning a ray for intersection testing against geometry of a scene represented by the bounding volume hierarchy.

* * * * *